(12) United States Patent
Nozawa

(10) Patent No.: US 9,298,408 B2
(45) Date of Patent: Mar. 29, 2016

(54) PRINT CONTROL DEVICE, PRINTING SYSTEM, SERVER DEVICE, AND PRINT CONTROL PROGRAM FOR IDENTIFYING PRINTING DEVICE

(71) Applicant: SEIKO EPSON CORPORATION, Tokyo (JP)

(72) Inventor: Shinji Nozawa, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/974,454

(22) Filed: Aug. 23, 2013

(65) Prior Publication Data

US 2014/0063543 A1 Mar. 6, 2014

(30) Foreign Application Priority Data

Sep. 3, 2012 (JP) .................. 2012-192867

(51) Int. Cl.
*G06F 3/12* (2006.01)
*H04N 1/00* (2006.01)
*G06K 15/02* (2006.01)

(52) U.S. Cl.
CPC .............. *G06F 3/126* (2013.01); *G06F 3/1204* (2013.01); *G06F 3/1228* (2013.01); *G06F 3/1245* (2013.01); *G06F 3/1288* (2013.01); *G06F 3/122* (2013.01); *G06K 15/02* (2013.01); *H04N 1/00244* (2013.01); *H04N 2201/0039* (2013.01)

(58) Field of Classification Search
CPC ........... G06F 3/126; H04N 2201/0039; H04N 2201/0065
USPC .......................................... 358/1.15
See application file for complete search history.

(56) References Cited

U.S. PATENT DOCUMENTS

| 2002/0080391 | A1 | 6/2002 | Sugiura et al. | |
| 2003/0025934 | A1* | 2/2003 | Takamiya | 358/1.15 |
| 2003/0107762 | A1* | 6/2003 | Kinoshita | G06Q 10/107 358/1.15 |
| 2003/0233411 | A1* | 12/2003 | Parry et al. | 709/206 |
| 2004/0246515 | A1* | 12/2004 | Patton et al. | 358/1.15 |
| 2006/0017965 | A1* | 1/2006 | Tonegawa | 358/1.15 |
| 2008/0309961 | A1* | 12/2008 | Aichi et al. | 358/1.15 |
| 2010/0328707 | A1* | 12/2010 | Miyake | 358/1.15 |
| 2011/0176162 | A1* | 7/2011 | Kamath et al. | 358/1.15 |
| 2013/0094048 | A1* | 4/2013 | Sako | G06F 3/1222 358/1.14 |

FOREIGN PATENT DOCUMENTS

JP 2002-182866 A 6/2002

* cited by examiner

*Primary Examiner* — Miya J Cato
(74) *Attorney, Agent, or Firm* — Global IP Counselors, LLP

(57) ABSTRACT

The advantage of the invention is to make settings on a printer to be connected with a network easy. A printer driver is connected with a server device for managing a printer A and an e-mail address by linking them through a network, and transmits print job data to the server device. The printer driver receives designation of an e-mail address managed by the server device, identifies printer A based on the designated e-mail address, and converts data as a target of printing into print job data in accordance with the identified printer A.

8 Claims, 4 Drawing Sheets

PRINT CONTROL DEVICE, PRINTING SYSTEM, SERVER DEVICE, AND PRINT CONTROL PROGRAM FOR IDENTIFYING PRINTING DEVICE

CROSS-REFERENCE TO RELATED APPLICATIONS

This application claims priority to Japanese Patent Application No. 2012-192867 filed on Sep. 3, 2012. The entire disclosure of Japanese Patent Application No. 2012-192867 is hereby incorporated herein by reference.

BACKGROUND

1. Technical Field

The present invention relates to a print control device, a printing system, and a print control program.

2. Background Technology

A print control method, for example, as shown in Patent Document 1, has been known as a method for printing a desired image in a printer connected with an information instrument such as a personal computer, a tablet terminal, a smart phone, or the like, through a network. According to this print control method of Patent Document 1, a user needs to register a printer on a server before executing printing. For registration, it is necessary to acquire various information regarding the printer including the printer name, the protocol name, and the information of output destination, and send the acquired information to a management section of the server that manages the printer information.

Japanese Laid-open Patent Publication No. 2002-182866 (Patent Document 1) is an example of the related art.

SUMMARY

Problems to be Solved by the Invention

Normally, however, an ordinary user is not involved in information such as a printer name, a protocol name, and the information of output destination. Therefore, in order to acquire such information, a user needs to call up a setting screen or the like of the information instrument in use, and it takes a lot of time and labor to acquire such information and set the printer.

The invention has been made to at least partly address the above-described circumstances, and the invention can be implemented as the following aspect or application example.

Means Used to Solve the Above-Mentioned Problems

Application Example

A print control device of the present application example includes an identifying unit that identifies a printing device connected through a network using an e-mail address managed by a server device connected through the network, and a converting unit that converts image data into print data in accordance with the printing device.

With this configuration, the print control device identifies a printing device using an e-mail address, and generates print data in accordance with the identified printing device. Therefore, it is possible to save the trouble of acquiring various information to identify a printing device, and make identification of a printing device easy.

BRIEF DESCRIPTION OF THE DRAWINGS

Referring now to the attached drawings which form a part of this original disclosure.

DETAILED DESCRIPTION OF EXEMPLARY EMBODIMENTS

Next, an embodiment of the invention will be explained with reference to the attached drawings.

Embodiment

Figure 1:
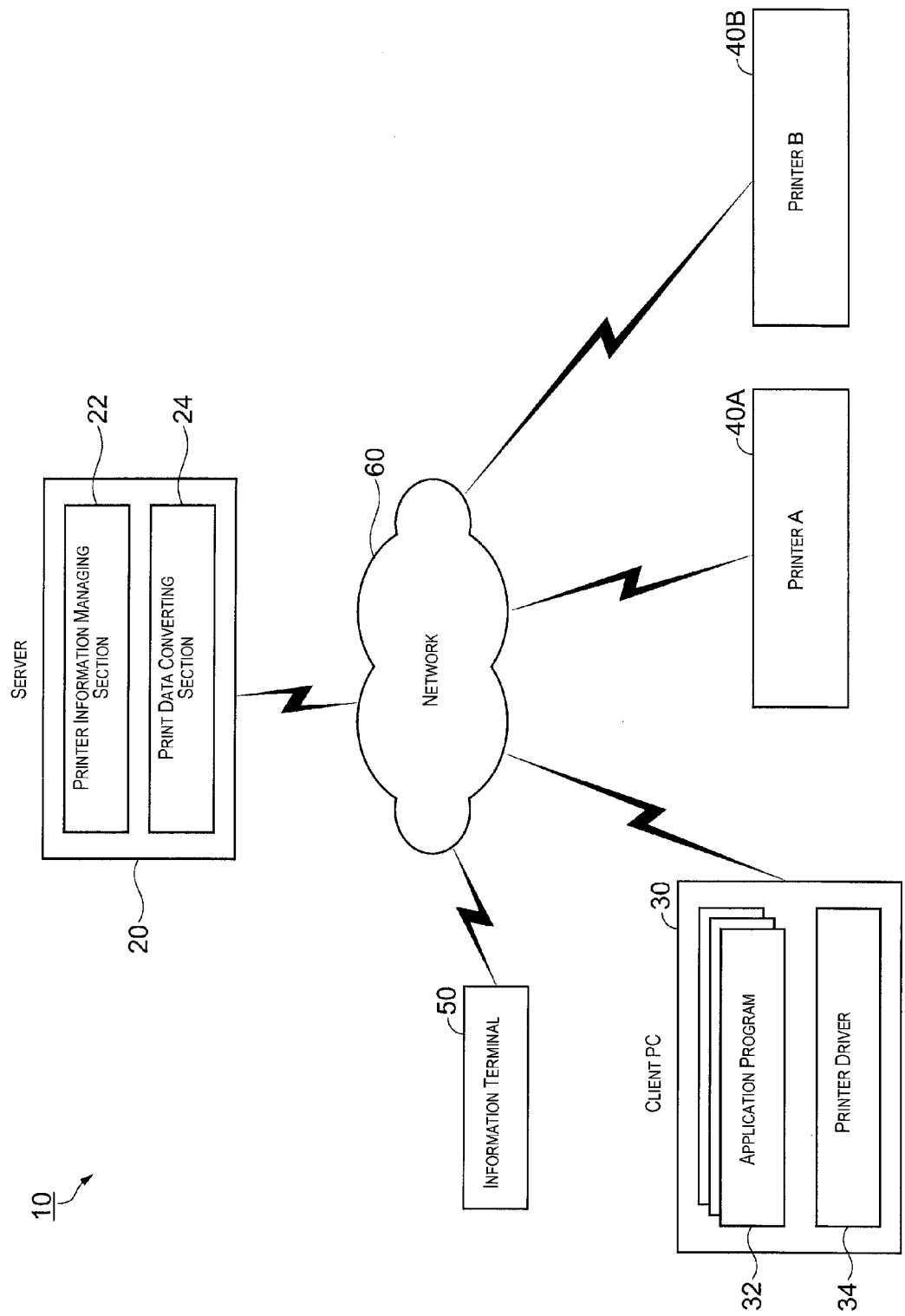
FIG. 1 is a diagram that shows a configuration of a printing system according to an embodiment of the invention.

FIG. 1 is a diagram that shows a configuration of a printing system 10. The print system 10 is constructed of a server 20, a client PC 30, and printers, which are connected such that communication is possible through a network 60 such as a LAN or the like. In the present embodiment, the printers as the printing device include a printer A (40A) and a printer B (40B). However, the number of the printers is not limited to two. An e-mail address is assigned to the printer A (40A) and the printer B (40B) in order to uniquely identify each of them.

The client PC 30 is a personal computer that serves as the print control device, and includes a CPU, a RAM, a ROM, a storing device, and the like, which are not shown in the drawing. Each function is controlled by a predetermined OS. As software, an application program 32, a printer driver 34, and the like is installed in the client PC 30. The application program 32 is used for creating an image or a document such as sentences, and the printer driver 34 is a print control program for controlling a print operation of the printer. A user can identify the printer and conduct settings regarding connection with the printer by calling up a user interface (UI) screen (not shown in the drawing) of the printer driver 34 and inputting the e-mail address of the printer A (40A) or the printer B (40B) (identifying unit).

Also, a user can create a document by the application program 32, and issue print instructions from the menu of the application program 32. In accordance with the instructions, the printer driver 34 asks the server 20 whether printing is possible in the printer A (40A) or the printer B (40B) which is designated as the print destination. When printing is possible, the printer driver 34 generates print job data based on the document to be printed (converting unit). In the present embodiment, image data contained in the print job data is print intermediate data formed in a data format suitable for communication such as a PNG (Portable Network Graphic) format, for example. The print job data generated by the printer driver 34 is transmitted to the server 20 through the network 60.

In a case of instructing printing with a paper size other than a predetermined paper size such as A4, for example, the printer driver 34 conducts a process for enlarging or reducing image such that the image falls within a predetermined paper size, and generates print job data in which the printing paper size is made the same predetermined paper size. Also, a user can request the server 20 to disclose the information regarding the log of the user's printing through the printer driver 34.

The server 20 is a server device that includes a CPU, a RAM, a ROM, a storing device, and the like, which are not shown in the drawing, and also includes a printer information managing section 22 and a print data converting section 24 as services for printing. The printer information managing section 22 manages information regarding a printer in which a printing service can be conducted by the server 20 (managing unit). For example, an administrator of the printer A (40A) can issue instructions to the server 20 so as to assign an e-mail address for identifying the printer A (40A) through an information terminal 50 or the like. When the server 20 conducts a process for assigning an e-mail address, the printer information managing section 22 acquires and retains information regarding the capability of the printer A (40A). The information regarding the capability of the printer A (40A) refers to capability information such as a paper cassette that can be attached, a corresponding paper size, a printing mode that can be selected, or the like.

The capability information is transmitted to the client PC 30 in a case where a printer is set to be printable in the client PC 30. With this, the capability information is reflected on the UI screen of the printer driver 34, and print job data is generated based on the settings on the UI screen. The printer information managing section 22 manages the print log based on an ID (client ID) for identifying the client PC 30 or a user. Therefore, in a case where the print log is requested based on the settings of the printer driver 34, the printer information managing section 22 collects print information corresponding to the client ID, describes it in an HTML format or the like, and notifies the client PC 30 of URL information that a user can display. The print data converting section 24 converts print intermediate data, such as PNG format data contained in the print job data transmitted from the client PC 30, into a printer job (second printer job) in a data format that can be processed by the printer (second converting unit). Here, the print job data transmitted from the client PC 30 is not limited to print intermediate data, and another configuration is possible in which conversion is not conducted in a case of a predetermined data format such as an ESC/P command. Further, the process for making the paper size the same predetermined paper size is not limited to a process conducted by the printer driver 34, and it can be conducted by the print data converting section 24.

The print job data converted by the print data converting section 24 is sent to the printer corresponding to the e-mail address instructed by a user through the network 60. The printer A (40A) and the printer B (40B) include a CPU, a RAM, a ROM, a printing engine, and the like, which are not shown in the drawing, and print an image based on print job data to a medium such as paper or the like when receiving the print job data transmitted from the server 20. Here, the printing method of the printing engine is not limited to a specific one, and an ink jet method, an electrophotographic method, a dot impact method, a thermal transfer method, or the like is possible. Further, in the case of the ink-jet method, a printer in which a liquid injecting head runs along the width direction of a printing medium or a line printer can be used.

Figure 2:
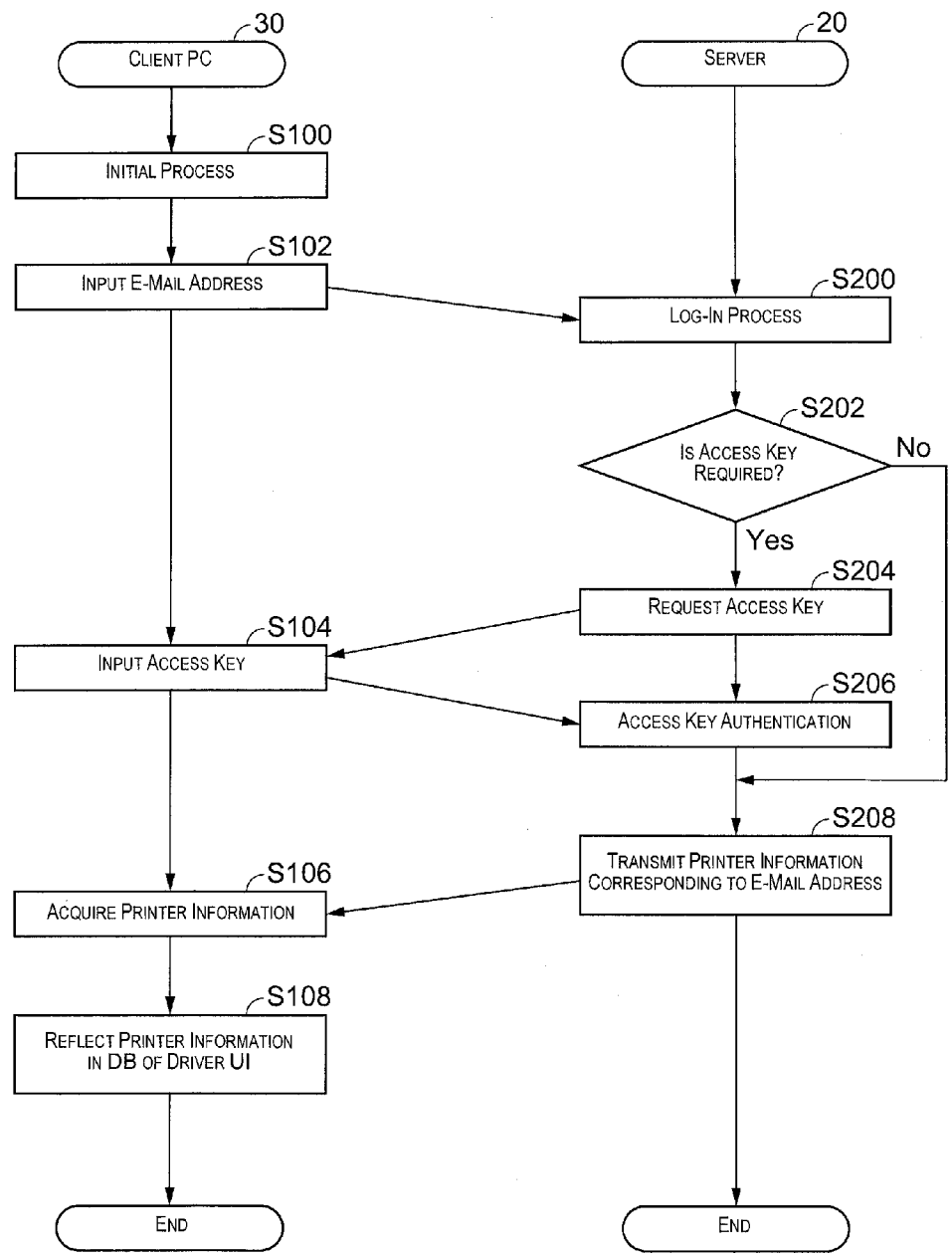
FIG. 2 is a flow chart of a process for setting connection of a printer.

FIG. 2 is a flow chart of a process for setting connection of a printer conducted by the printer driver 34. When this process is started, the CPU of the client PC 30 first executes an initial process such as selection of a language for use, acceptance of a contract clause, or the like (step S100). Next, the CPU of the client PC 30 displays the UI screen (not shown in the drawing) that requests inputting of an e-mail address assigned to the connected printer in advance (step S102). When a user inputs the e-mail address, information of the input e-mail address is sent to the server 20. The CPU of the server 20 conducts a log-in process based on the information of the e-mail address sent from the client PC 30 (step S200). Subsequently, the CPU of the server 20 determines whether or not an access key is required for the log-in process in accordance with the settings (step S202).

When it is determined that an access key is not required in accordance with the settings (No, in step S202), the process moves on to step S208. On the other hand, when it is determined that an access key is required in accordance with the settings (Yes, in step S202), the CPU of the server 20 requests the access key from the client PC 30 (step S204). At the access key request of the server 20, the CPU of the client PC 30 displays the UI screen (not shown in the drawing) that requests inputting of the access key. A user further inputs the access key on the UI screen (step S104). Information of the access key input by the user is sent to the server 20. Here, the access key input at this time is stored in a predetermined storing region of the client PC 30. When a printing process described below is conducted, inquiry to the server 20 can be conducted using the stored access key without inputting the access key by a user.

The CPU of the server 20 conducts authentication based on the access key sent from the client PC 30 (step S206). Although it is not shown in the drawing, in a case where authentication cannot be established, the server 20 sends the client PC 30 information indicating that authentication cannot be established. When receiving such information, the client PC 30 returns to step S102, and requests a user to input another e-mail address. On the other hand, in a case where the CPU of the server 20 can establish authentication based on the access key, the CPU of the server 20 conducts step S208. In step S208, the CPU of the server 20 finishes the log-in process, sends the printer information corresponding to the e-mail address to the client PC 30, and finishes the process for setting connection in the server 20.

The CPU of the client PC 30 acquires the printer information sent from the server 20 (step S106), and a printer cue in which the e-mail address and the printer are linked is generated and registered. Also, the CPU of the client PC 30 reflects the printer information in a database regarding the UI screen of the printer driver 34 (step S108), and finishes the process for setting connection in the client PC 30. With the above-described process, the printer linked by the e-mail address is registered on the client PC 30, and a user can designate the printer registered by using the e-mail address as the print destination. The printer information sent from the server 20 is reflected on the setting screen of the printer driver 34 regarding the registered printer.

Figure 3:
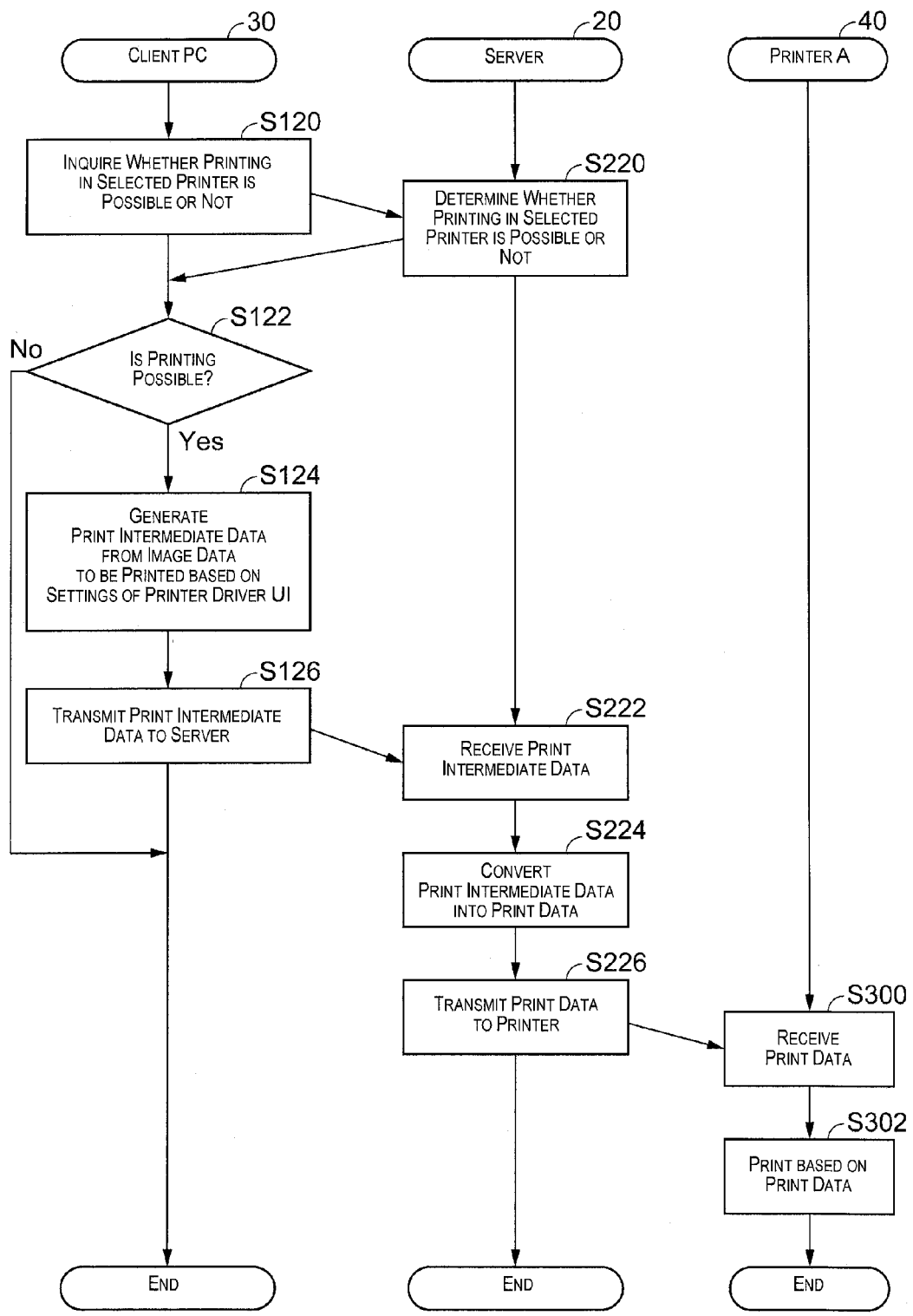
FIG. 3 is a flow chart that explains a printing process by the printing system.

FIG. 3 is a flow chart that explains a printing process by the printing system 10. First, a user of the client PC 30 selects the printer A (40A) registered by using the e-mail address, and instructs printing. The CPU of the client PC 30 inquires the server 20 whether printing in the printer A40 selected by the user is possible or not (step S120) <identifying function>.

The CPU of the server 20 determines whether printing in the printer A (40A) selected by the user is possible or not (step S220). In a case where authentication is established with an access key input by a user in the process for setting connection of the printer A (40A), the access key is used for this inquiry as well. In such a case, the user does not need to input the access key again, and the access key, input at the time of setting the connection and stored in the client PC 30, is sent to the server 20.

The client PC 30 is notified of the results determined by the server 20. Although it is not shown in the drawing, when it is determined that printing in the printer A (40A) selected by the user is not possible, the CPU of the server 20 does not conduct subsequent processes, and ends the printing process. The CPU of the client PC 30 acquires the determination results from the server 20, and determines whether printing is possible or not (step S122). When it is determined that printing is not possible (No, in step S122), the CPU of the client PC 30 ends the printing process. On the other hand, when it is determined that printing is possible (Yes, in step S122), the CPU of the client PC 30 generates print intermediate data from the image data to be printed based on the UI settings of the printer driver 34 (step S124) <converting function>.

Subsequently, the CPU of the client PC 30 sends the generated print intermediate data to the server 20 (step S126), and ends the printing process. The CPU of the server 20 receives the print intermediate data (step S222), and converts the received print intermediate data into print data (step S224). Subsequently, the CPU of the server 20 transmits the print data to the printer A (40A) (step S226), and ends the printing process. The CPU of the printer A (40A) receives the print data (step S300), conducts printing based on the received print data (step S302), and ends the printing process. With the above-described process, since the print data of the image to be printed is generated in the printer driver 34, the image can be printed without any limitation due to the data format of the image.

Figure 4:
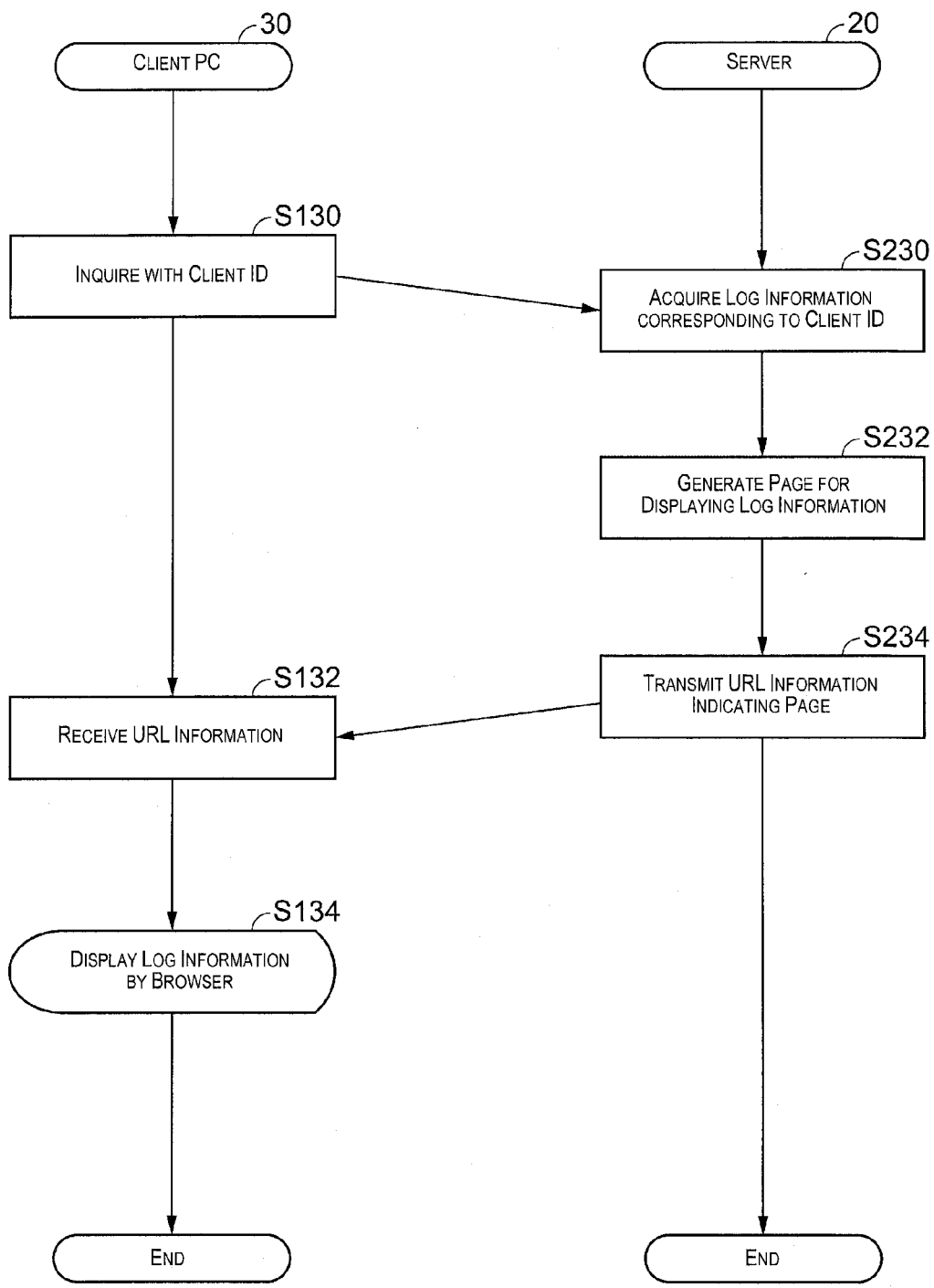
FIG. 4 is a flow chart that explains an acquiring process that acquires a print log.

FIG. 4 is a flow chart that explains an acquiring process in which the client PC 30 acquires a print log from the server 20. First, the CPU of the client PC 30 inquires the server 20 about acquisition of the log information with the client ID (step S130). Subsequently, the CPU of the server 20 acquires the log information corresponding to the client ID inquired by the client PC 30 (step S230). Subsequently, the CPU of the server 20 generates a page for displaying the acquired log information in an HTML language, for example (step S232), and stores it in a predetermined storing location.

Subsequently, the CPU of the server 20 transmits URL information indicating access to the stored page to the client PC 30 (step S234). The CPU of the client PC 30 acquires the URL information (step S132), and displays the log information indicated by the acquired URL information using a browser (step S134). With the above-described process, a user can get only information regarding the client ID, among information that has been printed in the past, on the screen of the client PC 30.

According to the embodiment described above, the following effects can be achieved:

(1) With the application program 32 that can call up the printer driver 34 and instruct printing, it is possible to conduct printing in a printer connected with the network 60 regardless of a format of image data.

(2) Since a user can register a printer for printing by using an e-mail address, it is not necessary to acquire information such as a protocol name, an output destination, or the like, which makes the register process of a printer easy.

A device for implementing the above-described technique includes various kinds of embodiments. There are cases in which it is achieved by a single device, and there are cases in which it is achieved by combining a plurality of devices.

Each configuration and the combination thereof in each embodiment are examples, and modifications such as addition, omission, or replacement of a configuration are possible as long as they do not depart from the subject matter of the invention. Further, the invention is not limited to the embodiments, and is limited only to the scope of the claims.

What is claimed is:

1. A print control device, which is connected with a server device through a network and transmits print job data to the server device, the server device managing first and second printing devices different from each other and first and second e-mail addresses different from each other by linking the first printing device with the first e-mail address and linking the second printing device with the second e-mail address, the print control device comprising:

an identifying unit that receives an input of at least one of the first and second e-mail addresses, transmits, to the server device, the first e-mail address when receiving the input of the first e-mail address, and transmits, to the server device, the second e-mail address when receiving the input of the second e-mail address, such that the first e-mail address is used to designate the first printing device as a designated printing device that is a printing destination to perform printing based on the print job data and the second e-mail address is used to designate the second printing device as the designated printing device, the first and second e-mail addresses being uniquely assigned to and uniquely identifying the first and second printing devices, respectively;

a user interface screen on which setting is performed to create the print job data including image data;

a converting unit that receives a printer information including capability information regarding capability of the designated printing device designated based on one of the first and second e-mail addresses from the server device, reflects the capability information on the user interface screen, and converts a print target data as a target of printing into the print job data including the image data in accordance with the setting on the user interface screen; and a transmitting unit that transmits to the server device, in a format that is different from an e-mail format, the print job data that designates the designated printing device as the printing designation.

2. The print control device according to claim 1, wherein the identifying unit registers the first and second e-mail addresses and the first and second printing devices by linking the first printing device with the first e-mail address and linking the second printing device with the second e-mail address.

3. The print control device according to claim 1, wherein the converting unit converts the print target data into the print job data such that an image based on the print target data falls within predetermined paper.

4. The print control device according to claim 1, further comprising a printer driver installed in the print control device, the printer driver including the identifying unit and the converting unit.

5. A printing system, in which a print control device, a server device, and first and second printing devices different from each other are connected each other through a network, the printing system comprising:

the server device having a managing unit that manages the first and second printing devices and first and second e-mail addresses different from each other by linking the first printing device with the first e-mail address and linking the second printing device with the second e-mail address, and a second converting unit that receives and converts print job data into a data format that is processed by a designated printing device that is a printing destination to perform printing based on the print job data;

the print control device having an identifying unit that receives an input of at least one of the first and second e-mail addresses, transmits, to the server device, the first e-mail address when receiving the input of the first e-mail address, and transmits, to the server device, the second e-mail address when receiving the input of the second e-mail address, such that the first e-mail address is used to designate the first printing device as the designated printing device and the second e-mail address is used to designate the second printing device as the designated printing device, the first and second e-mail addresses being uniquely assigned to and uniquely identifying the first and second printing device, and being used to designate the printing devices, respectively, a user interface screen on which setting is performed to create the print job data including image data, a first converting unit that receives a printer information including capability information regarding capability of the designated printing device designated based on one of the first and second addresses from the server device, reflects the capability information on the user interface screen, and converts a print target data as a target of printing into the print job data including the image data in accordance with the setting on the user interface screen; and a transmitting unit that transmit to the server device, in a format that is different from an e-mail format, the print job data that designates the designated printing device as the printing designation; and the first and second printing devices that print an image based on the print job data to a medium.

6. A printing system according to claim 5, wherein the identifying unit transmits, to the server device, at least one of the first and second e-mail addresses to perform the printing based on the print job data, and the first converting unit converts the print target data as the target of the printing into the print job data in accordance with the designated printing device.

7. The print control device according to claim 6, wherein the identifying unit registers in the printer driver at least one of the first and second printing devices that has been identified such that the at least one of the first and second printing devices that has been identified is designated as the printing destination through the printer driver.

8. A non-transitory computer-readable recording medium in which a print control program is stored, the print control program being connected with a server device through a network and transmits print job data to the server device, the server device managing first and second printing devices different from each other and first and second e-mail addresses different from each other by linking the first printing device with the first e-mail address and linking the second printing device with the second e-mail address, the print control program causing a computer to execute an identifying function that receives an input of at least one of the first and second e-mail addresses, transmits, to the server device, the first e-mail address when receiving the input of the first e-mail address, and transmits, to the server device, the second e-mail address when receiving the input of the second e-mail address, such that the first e-mail address is used to designate the first printing device as a designated printing device that is a printing destination to perform printing based on the print job data and the second e-mail address is used to designate the second printing device as the designated printing device, the first and second e-mail addresses being uniquely assigned to and uniquely identifying the first and second printing devices, respectively;

a converting function that receives a printer information including capability information regarding capability of the designated printing device designated based on one of the e-mail addresses from the server device, reflects the capability information on a user interface screen on which setting is performed to create the print job data including image data, and converts a print target as a target of printing into the print job data including the image data in accordance with the setting on the user interface screen; and a transmitting function that transmits to the server device, in a format that is different from an e-mail format, the print job data that designates the designated printing device as the printing designation.

* * * * *